Figure 1:
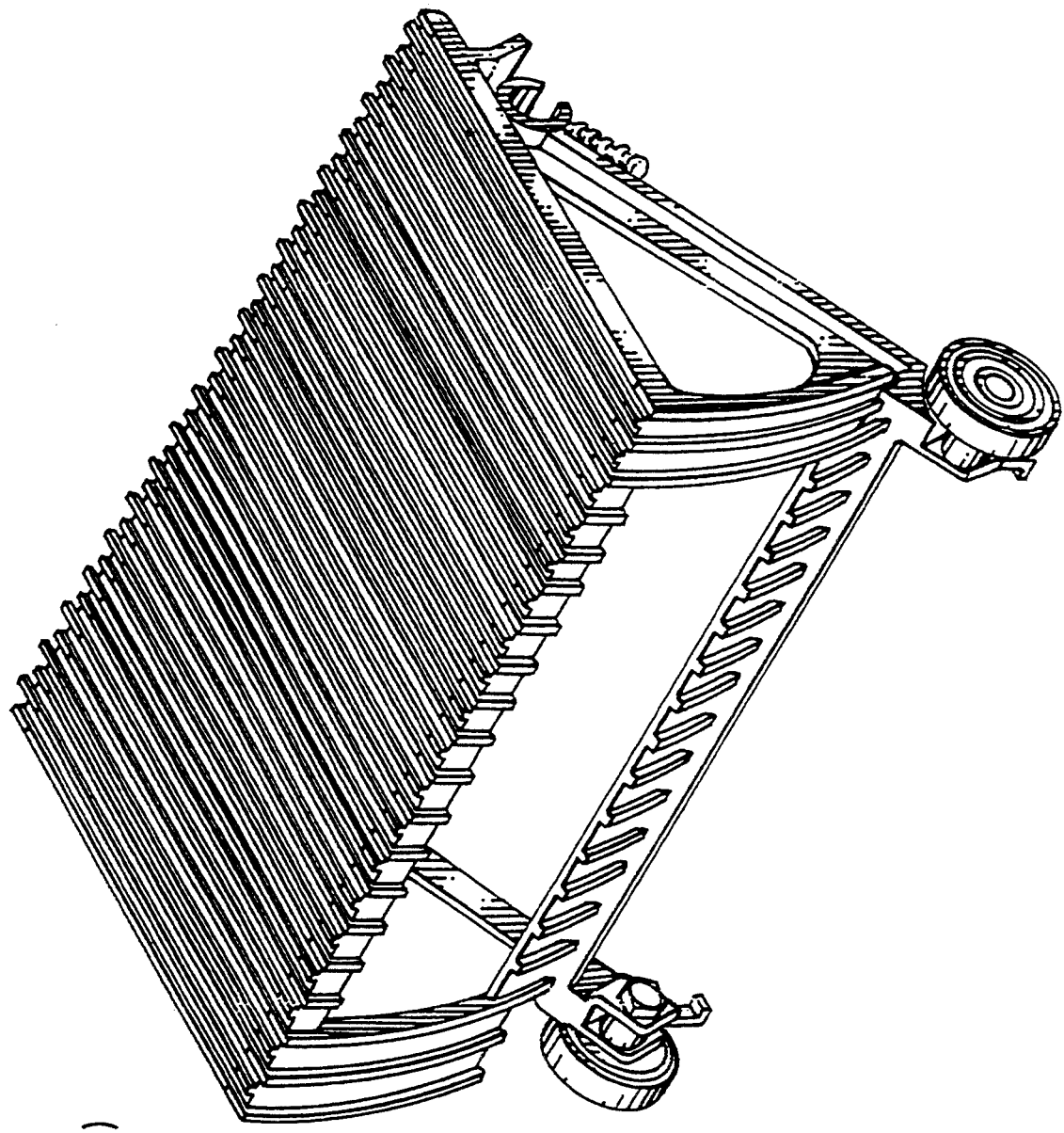

United States Patent [19]
Findlay

[11] Patent Number: 5,439,090
[45] Date of Patent: Aug. 8, 1995

[54] IMPROVEMENTS IN OR RELATING TO ESCALATORS

[75] Inventor: Alexander Findlay, Auckland, New Zealand

[73] Assignee: Escalator Advertising Limited, Auckland, New Zealand

[21] Appl. No.: 275,401

[22] Filed: Jul. 15, 1994

[30] Foreign Application Priority Data

Aug. 5, 1993 [NZ] New Zealand ......................... 248336

[51] Int. Cl.6 ............................................. B66B 23/12
[52] U.S. Cl. .................................. 198/333; 198/502.1
[58] Field of Search ............................. 198/333, 502.1

[56] References Cited

U.S. PATENT DOCUMENTS

| 2,292,534 | 8/1942 | Margles ................... | 198/333 |
| 2,723,020 | 11/1955 | Margles et al. ........ | 198/333 |
| 2,981,397 | 4/1961 | Hansen .................. | 198/333 |
| 5,176,239 | 1/1993 | Findlay et al. ......... | 198/333 |

FOREIGN PATENT DOCUMENTS 9222491 12/1992 WIPO ................... 198/333

Primary Examiner—Joseph E. Valenza
Attorney, Agent, or Firm—Young & Thompson

[57] ABSTRACT

A backing clement for an escalator step comprising a pre-fabricated plate having at least one attachment lug formed thereon, and at least one channel complementary to a projecting part of said cover, by which said cover can be engaged with said element as shown in selected FIG. 2.

3 Claims, 2 Drawing Sheets

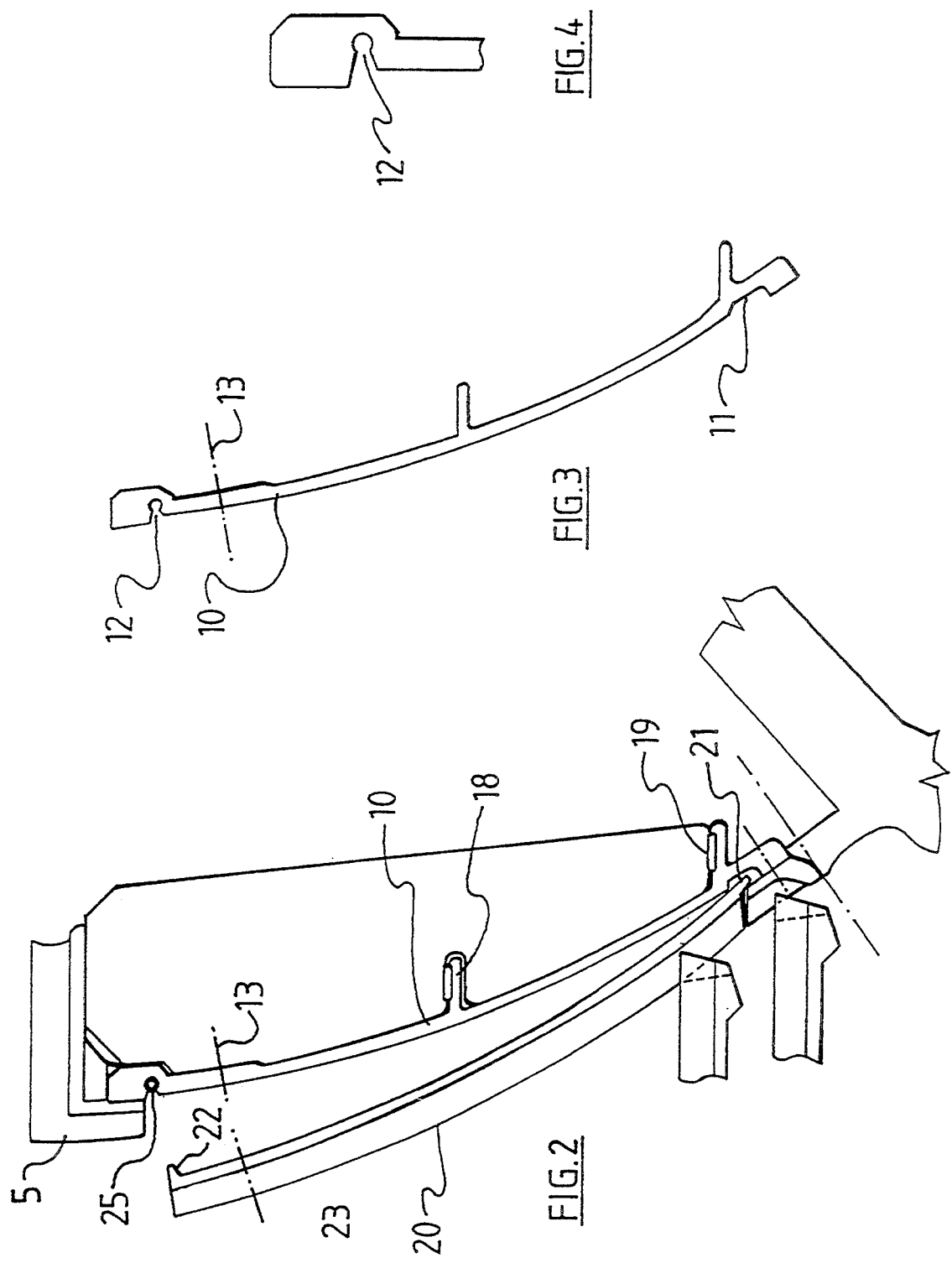

IMPROVEMENTS IN OR RELATING TO ESCALATORS

FIELD OF THE INVENTION

This invention relates to the field of advertising, and more particularly to improved means for providing indicia on an escalator.

PRIOR ART

International application PCT/GB92/01037 published under the Patent Cooperation Treaty WO92/22491 discloses a passenger conveying device having a plurality of interacting escalator steps, each step having a defined external profile allowing relative movement between adjacent steps wherein the steps have been modified for displaying indicia to a passenger on the steps. The indicia comprises a plurality of advertising signs on the riser and/or tread of the escalator. The sign is provided with a transparent cover which is positioned on the step so as not to interfere with the relative movement of adjacent steps on the escalator or the cyclic movement of the escalator itself. The cover has an external profile corresponding to the defined external profile of the steps.

OBJECT

It is an object of the present invention to go at least part way towards providing novel or improved means for providing indicia on an escalator, or at least to provide the public with a useful choice.

It is a further object for the present invention to go at least partway towards providing novel or improved means for safety on an escalator or, at least to provide the public with a useful choice.

STATEMENT OF INVENTION

In one aspect the present invention provides a component for a passenger conveying device such as an escalator or travelator having a plurality of interacting movable steps, each said step having defined external profile allowing relative movement between adjacent steps, and at least one of said steps having a cover fixed to said step, said cover having an external profile corresponding to the defined external profile of said steps, and said component comprising a backing element under said cover, characterised in that said backing element comprises a pre-fabricated plate having at least one attachment lug formed thereon, and at least one channel complementary to a projecting part of said cover, by which said cover can be engaged with said element.

Preferably the element further includes at least one opening complementary to an aperture in said cover, by which a fastener can be passed through said cover and said element to connect them.

Preferably the element further includes a resilient sealing element against which said cover can be fastened, to seal between them.

PREFERRED EMBODIMENTS

The following is a description of preferred forms of the present invention, given by way of example only, with reference to the accompanying drawings, in which:

FIG. 1: illustrates prior art.

FIG. 2: illustrates a preferred form of the present invention in side view.

FIG. 3: illustrates a preferred backing plate in side view.

FIG. 4: shows a channel section in more detail.

One-piece die-cast aluminium escalator steps are the preferred manner of manufacture for new escalator steps in the world today. However the following description would also apply to a modular die-cast step.

FIG. 1 illustrates the prior art and shows a drawing taken from published International PCT application No. PCT/GB92/01037. This diagram discloses a means of displaying indicia onto a one-piece die-cast step. The escalator step is milled to adapt the riser and/or tread of the existing step to receive and display indicia preferably in the form of a sign. A transparent cover plate protects the signs and substantially restores the original cleats removed in milling the original riser and/or tread surface.

There is a need for a convenient means for supporting the cover plate and display indicia in the space milled out of the riser. While such support means can be fabricated from sheet material and fastened in place with screws, welds and brackets as described in the above prior art, such fabrication is relatively time-consuming and difficult, and may result in differences and irregularities between steps.

As illustrated in FIG. 2, a preferred form of the present invention shows an existing one-piece die-cast aluminium step 5 in side view, having new inserted extruded backing plate 10, gusset(s) 15, cover plate 20 and weather seal 25. Indicia (not shown) in the form of safety messages, advertising or other signage can be incorporated into any of the elements described below or could be an independent flexible sign preferably supported by backing plate 10.

Preferably a portion of the riser is cut away in the present example. Since many of the steps will not be new, it is preferable to check any step damage or distortion prior to modification so that any modification to the existing step will conform to manufacturer's tolerances.

Preferably machining is performed in a manner which ensures uniformity from step to step. A lateral cut is made along the tread and wheel edge of the riser between the outer struts of the steps so that the original reinforcing riser gussets (not shown) in line with the wheel struts are left intact, preferably leaving at least a 20 mm overlap area for mounting new extruded backing plate 10.

Although cutting a window portion in the step is most preferred because of the original structure of the step, alternatively, substantially the whole riser may be removed by milling away the original cleats, however retaining the outer wheel struts. Preferably at least one cleat would be retained or restored to either end of the step, perhaps using a gusset on either end of the step. It would be preferred to have a metal cleat at either end so that if there is contact at either end of the step, between the step and the escalator, any contact is preferred to be metal against metal rather than non-metal against metal.

In the present case the riser is machined to provide a 12 mm–20 mm overlap along the inner tread edge of the riser and machined along the wheel edge of the riser approximately 250 mm from the outer top edge of the tread cleats (when measured around the radius of the riser). Backing plate 10 is preferably manufactured from aluminium in a one-piece extruded form. An extrusion process of manufacture is preferred because of the exacting dimensions and fine tolerances which can be achieved as opposed to a casting process. The backing plate preferably has a radius substantially the same as the existing riser. In most escalators the radius of the riser is approximately 390 mm. In the present example the radius is approximately 430 mm.

Backing plate 10 preferably includes channel section 11 which runs along its wheel edge for substantially the entire length of the plate. The channel section is preferably adapted to receive a corresponding lateral ridge 21 at the wheel edge of cover plate 20. This cooperative arrangement is preferred because the cover plate can now be held in place without the need for fasteners at its base. Furthermore this arrangement prevents the cover plate, signage or other indicia from falling onto the adjacent escalator step below. Alternative methods of supporting the cover plate at its wheel edge may be suitable however those methods which incorporate the use of base fasteners are less efficient and therefore less preferred than those which do away with the need for a base-fastening arrangement.

At the tread edge of plate 10, the backing plate further consists of a channel section 12 into which is preferably placed a weather seal 25. The weather seal is in this example hollow and can be manufactured from suitable synthetic materials, rubber or nylon material, having an appropriate degree of flexibility and bias. The weather seal is preferred particularly in relation to outdoor escalators such as those escalators in underground sub-ways etc. Preferably the weather seal would comprise a flame retardant.

The weather seal is adapted to cooperatively interact with lateral ridge 21 so that in use when the cover plate is secured onto the step, the weather seal is able to provide a seal which substantially prevents entry of fine particles of dirt and dust and moisture. It is preferable to have a weather seal because dust particles are able to enter behind the cover plate and detract from the indicia displayed. Using a weather seal substantially reduces the amount of dirt and moisture entering behind the cover plate.

The backing plate 10 preferably also includes pre-drilled openings 13 to facilitate fastening of cover plate(s) 20, as described below.

Prior to modification of the existing escalator step, gussets (not shown) may be included in the de novo manufacture of the die-cast step to further support the tread and riser. If those gussets are cut away during modification of the step as in the present example, they are preferably restored with gusset(s) 15 to support plate 10. Similarly, new gusset(s) 15 may be used on steps where no such support was provided in the original construction. Gusset 15 shown in FIG. 2 is an example of a series of gussets constructed, preferably of 3 mm thickness aluminium and shaped to support the full length of the newly inserted backing plate. These gussets are preferably aligned with remnants of any original gussets and affixed into place.

Securing plate 10 and gussets 15 is preferably achieved by a welding process. Welding directly onto the front or rear surface of the backing plate is less preferred because the high welding temperatures can distort the metal plate and, if the plate has been anodized to give a coloured or special effect, the anodizing could be ruined. To relieve this problem, plate 10 is provided with at least one backwardly disposed ridge 18. In the present case ridge(s) 18 project outwardly from the back surface 13 of plate 10 and run laterally substantially the length of plate 10. Using these ridges, plate 10 can be preferably lug welded 19 to gusset(s) 15, and in this way the lug welds do not directly contact the radiused portion of plate 10, and minimise any possibility of distortion in the plate from the welding process.

Cover plate 20 is preferably transparent and provides a hard wearing, non-scratch surface.

Preferable material for these cover plates is polycarbonate materials because of the many varieties of end product which can be achieved using appropriate plastics materials. It will be apparent that other suitable materials may be used such as toughened glass or appropriate resin material which is transparent on opaque.

Preferably the cover plate would be moulded so as to substantially replicate the radiused cleats on the original riser.

As shown in FIG. 2 the cover plate is fastened to plate 10 by way of suitable fasteners such as DZUS screws which extend through openings 23 in a number of the grooved portions in the cover plate and screw into corresponding openings 13 in the backing plate. DZUS screws are preferred because they provide a tamper-proof fastening system which is quick release and vibration proof.

The advantage of the present system is the way in which the escalator can be maintained efficiently by even a single maintenance operator. In the case of advertising on escalator steps, where advertising is regularly being replaced on the steps, any cumbersome maintenance system is going to be less preferred for the escalator advertising operator. Commercially, a system displaying indicia on escalator steps would preferably be tamper-proof and the advantage of fastening the cover plate along the tread edge of the riser in the present invention is that on unfastening the cover plate, the plate can be held by way of channel section 11 and will not fall onto the adjacent step. It is as if channel section 11 of plate 10 provides a "third hand" for the maintenance operator allowing the riser plate 20 to be unfastened and to fall open in a controlled manner along its tread edge such that the operator can, in the case of advertising, replace the signage. In combination with suitable fasteners such as DZUS screws which provide a "one-turn quick release" arrangement, a maintenance operator need only carry with him the appropriate tool for releasing and securing the fasteners, and the new signage to be substituted.

Riser cover plates are preferably manufactured so that at least two or three plates are required for example to restore the riser profile on a one meter long step. The grooved portions on the outer edge of each plate are preferably cut so that adjacent plates can be overlapped and inserted to restore the original riser. For narrower steps of the same profile, cover plates are preferably trimmed to size for cost and efficiency reasons.

Cover plates manufactured in this size are preferred because of the cost advantages to the escalator advertising operator. It is possible that cover plates will be damaged by hard wearing particularly in sites where there is a high flow of passenger traffic. Replacement of the damaged cover plate can easily be achieved by simply substituting a new plate, but this is costly if the cover plate has been manufactured in one piece. Consequently there would appear to be cost savings in manufacturing the plates in smaller lengths and using those plates to replace only the damaged portion of the restored riser.

The use of a pre-fabricated backing plate 10, incorporating pre-drilled openings 13 and/or other engagement means such as the channel section 11 or channel 12, facilitates efficient maintainance of the system, by ensuring that the positioning and relationship between engagement means is consistent and correct. In particular, this consistency is desirable when using a cover plate made up of a number of short sections, to ensure that adjacent sections are abutted snugly.

Preferably substantially all components could be pre-fabricated for modification of each model of step, whether it be a one-piece or modular die-cast aluminium step.

In the case of a one-piece or modular die-cast step, it is preferred for substantially all of the riser to be machined away and to cut out a window portion in the riser and the riser restored by way of pre-fabricated extruded backing plate, cover plate, and weather seal.

Indicia preferably in the form of advertising and/or safety messages would be prepared either for the cover plate, the backing plate or an independent sign depending upon the materials used to manufacture the backing plate. In the present example, aluminium is used to manufacture the backing plate, however if other materials such as high density plastics are used, the backing plate itself could display indicia and/or provide an additional visual affect for the riser on the step.

Preferably the cover plate would be releasably attached to the step using appropriate fasteners as to substantially prevent access to the indicia by passengers on the escalator.

In another form, the invention provides a pre-fabricated kit of parts for modification of new and existing escalator steps.

Preferably the kit of parts would consist of a one-piece extruded backing plate, at least one protective cover plate, preferably manufactured from transparent hard wearing non-scratch material such as polycarbonate or toughened glass or some other suitable resin, optional gussets to preferably restore and support the modified step, and a weather seal.

The weather seal preferably seals against a corresponding lateral ridge on the cover plate so as to weather proof the modified escalator step substantially reduced the entry of dirt and moisture in behind the back of the cover plate.

In yet another form, the invention provides a method of manufacturing new steps for an escalator. Preferably this would involve moulding a new escalator step, and/or pre-fabricated components for a new escalator step, preferably including a pre-fabricated extruded backing plate. Preferably the riser of the new step would have an area without cleats supported by a substantially planar backing surface wherein the backing surface provides substantially along its wheel edge means for supporting a sign and/or cleated cover plate. More preferably the backing surface would also comprise a channel section along its tread edge adapted to receive a weather seal.

An advantage of the preferred system is that it can simplify the modification, construction and maintenance of the escalator steps, particularly when the modified steps are used for displaying advertising and signage, and signs are replaced on a regular basis by service operators.

The entire riser can be replaced using this system although it does still allow the option to cut out a window portion of the riser if required. However in the case of demountable escalator step the option to discard or keep the existing riser for other occasions is preferred. For example, existing sub-frame steps could be converted for a particular occasion perhaps if the building was a retail outlet which celebrated its birthday each year. Escalators could be converted for the birthday celebration and then substituted again with the pre-existing old riser for further use.

It is likely in the future that a die-cast or extruded, high density plastic step will be manufactured for new escalators. In general, internal construction of escalator machinery makes use of precision extrusions in aluminium, or aluminium and steel castings and fabrications. The aluminium profiles can be anodized in a variety of colours or powder-coated to a wide range of colours. One-piece and modular die-cast aluminium steps have replaced the fabricated components of earlier escalators. This has allowed the tolerances between parts to be reduced and also given significant weight and cost savings on each step. However, it will be appreciated that a die-cast, high-density plastic one-piece or modular step could be produced, and a backing plate, cover plate and/or other components might be produced from the same materials within the scope of the present invention.

Other modifications might also be made to the modified riser design including the backing plate, weather seal and cover plate, to suit other specific types of escalator steps. The general scope of the invention, encompassing all such modifications, may be characterised by the following claims.

We claim:

1. A component for a passenger conveying device such as an escalator or travelator having a plurality of interacting movable steps, each said step (5) having a defined external profile allowing relative movement between adjacent steps, and at least one of said steps having a cover (20) fixed to said step, said cover having an external profile corresponding to the defined external profile of said steps, and said component comprising a backing element (10) under said cover (20), characterised in that said backing element comprises a pre-fabricated plate having at least one attachment lug (18) formed thereon, and at least one channel (11, 12) complementary to a projecting part of said cover, by which said cover can be engaged with said element.

2. A component as claimed in claim 1, characterised in that said element further includes at least one opening 13 complementary to an aperture 23 in said cover, by which a fastener can be passed through said cover and said element to connect them.

3. A component as claimed in claim 1, characterised in that said element further includes a resilient sealing element 25 against which said cover can be fastened, to seal between them.

* * * * *